(12) United States Patent
Santharam et al.

(10) Patent No.: US 7,395,336 B1
(45) Date of Patent: Jul. 1, 2008

(54) METHOD FOR MANAGING SIP REGISTRATIONS IN A TELECOMMUNICATIONS NETWORK

(75) Inventors: Arun Santharam, Overland Park, KS (US); Farni Weaver, Spring Hill, KS (US); Piyush Jethwa, Overland Park, KS (US); Debashis Haldar, Olathe, KS (US); Lyle Bertz, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1144 days.

(21) Appl. No.: 10/145,005

(22) Filed: May 14, 2002

(51) Int. Cl.
G06F 15/16 (2006.01)

(52) U.S. Cl. .................. 709/227; 719/310; 719/320

(58) Field of Classification Search ......... 709/203–204, 709/220–223, 226–229, 328, 249; 707/10; 370/230, 235, 260, 74, 95; 455/518, 414.2, 455/416

See application file for complete search history.

(56) References Cited

U.S. PATENT DOCUMENTS

| 6,266,782 B1 * | 7/2001 | Carter et al. ................ 714/4 |
| 6,714,987 B1 * | 3/2004 | Amin et al. ................ 709/249 |
| 6,885,861 B2 * | 4/2005 | Koskelainen ............ 455/414.2 |
| 6,898,436 B2 * | 5/2005 | Crockett et al. ............ 455/518 |
| 6,961,575 B2 * | 11/2005 | Stanforth .................. 455/445 |
| 7,151,946 B2 * | 12/2006 | Maggenti et al. ............ 455/517 |

OTHER PUBLICATIONS

Internet Engineering Task Force ("IETF") Request for Comments ("RFCs") 768, "User Datagram Protocol," J. Postel, Aug. 1980.
Internet Engineering Task Force ("IETF") Request for Comments ("RFCs") 791, "Internet Protocol DARPA Internet Program Protocol Specification," Information Sciences Institute, Sep. 1981.
Internet Engineering Task Force ("IETF") Request for Comments ("RFCs") 793, "Transmission Control Protocol DARPA Internet Program Protocol Specification," Information Sciences Institute, Sep. 1981.
Internet Engineering Task Force ("IETF") Request for Comments ("RFCs") 1541, "Dynamic Host Configuration Protocol," R. Droms, Oct. 1993.
Internet Engineering Task Force ("IETF") Request for Comments ("RFCs") 1661, "The Point-to-Point Protocol (PPP)," W. Simpson, Jul. 1994.
Internet Engineering Task Force ("IETF") Request for Comments ("RFCs") 1662, "PPP in HDLC-like Framing," W. Simpson, Jul. 1994.
Internet Engineering Task Force ("IETF") Request for Comments ("RFCs") 1663, "PPP Reliable Transmission," D. Rand, Jul. 1994.

(Continued)

Primary Examiner—Nathan Flynn
Assistant Examiner—Jude J Jean-Gilles (57) ABSTRACT

A wireless device may connect to a telecommunications network and register with a Session Initiation Protocol server. The Session Initiation Protocol server may notify a network element on the telecommunications network of the wireless device's registration. In response to a disconnection of the wireless device from the telecommunications network, the network element may notify the Session Initiation Protocol server of the wireless device's disconnection. The Session Initiation Protocol server may then responsively deregister the wireless device.

27 Claims, 8 Drawing Sheets

OTHER PUBLICATIONS

Internet Engineering Task Force ("IETF") Request for Comments ("RFCs") 1853, "IP in IP Tunneling," W. Simpson, Oct. 1995.
Internet Engineering Task Force ("IETF") Request for Comments ("RFCs") 2002, "IP Mobility Support," C. Perkins, Oct. 1996.
Internet Engineering Task Force ("IETF") Request for Comments ("RFCs") 2003, "IP Encapsulation within IP," C. Perkins, Oct. 1996.
Internet Engineering Task Force ("IETF") Request for Comments ("RFCs") 2004, "Minimal Encapsulation within IP," C. Perkins, Oct. 1996.
Internet Engineering Task Force ("IETF") Request for Comments ("RFCs") 2005, "Applicability Statement for IP Mobility Support," J. Solomon, Oct. 1996.
Internet Engineering Task Force ("IETF") Request for Comments ("RFCs") 2131, "Dynamic Host Configuration Protocol," R. Droms, Mar. 1997.
Internet Engineering Task Force ("IETF") Request for Comments ("RFCs") 2132, "DHCP Options and BOOTP Vendor Extensions," Alexander, et al., Mar. 1997.
Internet Engineering Task Force ("IETF") Request for Comments ("RFCs") 2138, "Romote Authentication Dial in User Service (RADIUS)," Rigney, et al., Apr. 1997.
Internet Engineering Task Force ("IETF") Request for Comments ("RFCs") 2486, "The Network Access Identifier," Aboba, et a., Jan. 1999.
Internet Engineering Task Force ("IETF") Request for Comments ("RFCs") 2543, "SIP: Session Initiation Protocol," Handley, et al., Mar. 1999.
Internet Engineering Task Force ("IETF") Request for Comments ("RFCs") 2924, "Accounting Attributes and Record Formats," Brownlee, et al., Sep. 2000.

* cited by examiner

METHOD FOR MANAGING SIP REGISTRATIONS IN A TELECOMMUNICATIONS NETWORK

FIELD OF THE INVENTION

This invention relates to telecommunication networks. More specifically, it relates to a method for deregistering a client from a registration with a server.

BACKGROUND OF THE INVENTION

A wireless device may connect to a telecommunications network, and the wireless device may be assigned an Internet Protocol address. The telecommunications network may in turn provide connectivity to the Internet. Once connected to the telecommunications network, the wireless device may then communicate with other devices on the telecommunications network or on the Internet. The wireless device may communicate with a Session Initiation Protocol server, which can be used to establish sessions between the wireless device and a network device.

The wireless device may register with the Session Initiation Protocol server, such as by sending the Session Initiation Protocol server a register message that includes the current Internet Protocol address of the wireless device. The Session Initiation Protocol server may then start an expiration timer for the registration, which can be periodically reset by the wireless device. The registration can remain active as long as the timer does not expire. Once registered, the Session Initiation Protocol server may be used to establish sessions between the wireless device and other devices. For example, the Session Initiation Protocol Server may receive a request from the network device to establish a session between the network device and the wireless device. The Session Initiation Protocol server may forward the request directly to the wireless device. Alternatively, the Session initiation Protocol server may notify the network device of the wireless device's current address, and the network device can send the request directly to the wireless device.

The wireless device, however, may disconnect from the telecommunications network without deregistering from the Session Initiation Protocol server. For example, the wireless device may lose contact over its air interface with the telecommunications network. Although disconnected from the wireless telecommunications network, the Session Initiation Protocol server may still maintain the registration for the wireless device, because the wireless device did not deregister and the expiration timer has not yet expired.

Since the expiration timer remains active for a period of time after the wireless device disconnects from the telecommunications network, the Session Initiation Protocol server may still receive requests to establish a session with the wireless device, and it may attempt to forward those requests to the wireless device. It may also attempt to forward other messages to the disconnected wireless device, such as messages in an already established session. Additionally, the Session Initiation Protocol server may continue to inform other devices of the wireless device's current address, and the other devices may then attempt to send messages directly to the wireless device.

The processing performed by the Session Initiation Protocol server in attempting to send messages to the disconnected wireless device may delay processing messages destined for devices that are connected to the telecommunications network or to the Internet. Additionally, the messages sent to the disconnected wireless device may slow down other data traffic on the networks, and this can slow down communications between devices connected to the networks.

Therefore, there exists a need for an improved method for deregistering a wireless device from a Session Initiation Protocol server.

SUMMARY OF THE INVENTION

A wireless device may connect to a telecommunication network, for example, a CDMA2000 3G packet data telecommunications network. The wireless device may register with a Session Initiation Protocol server. Upon registration, the Session Initiation Protocol server may start an expiration timer indicating a duration for the registration. The Session Initiation Protocol server may also notify a network element of the registration for the wireless device.

The wireless device may then disconnect from the telecommunication network connection without deregistering from the Session Initiation Protocol server, for example, through an abnormal disconnection. The network element may then detect the disconnection of the wireless device, and it may notify the Session Initiation Protocol server. In response to the notification, the Session Initiation Protocol server may then deregister the wireless device before the expiration timer expires.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Architecture

Figure 1:
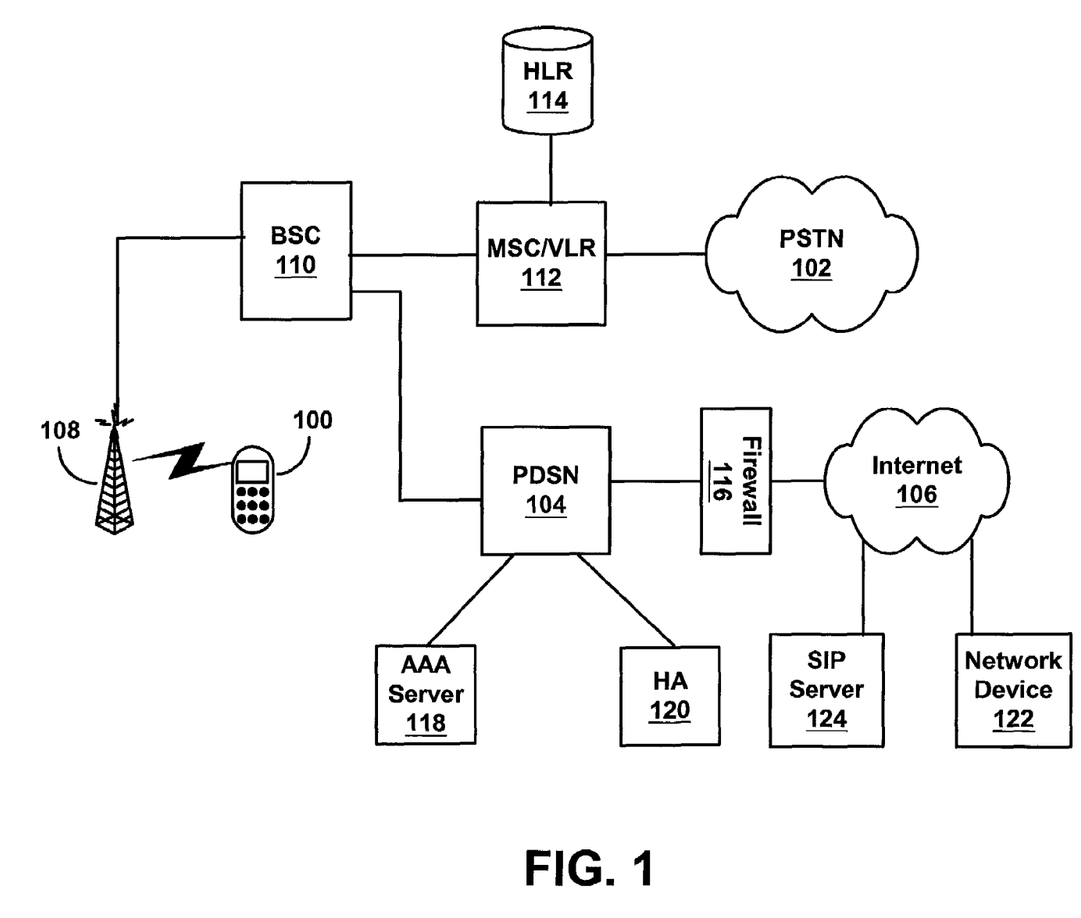
FIG. 1 shows an exemplary architecture for a cellular network that may be used to deregister a SIP client from a SIP server.

FIG. 1 shows an exemplary architecture for a cellular network that may be used to deregister a wireless device 100 from a server. In one exemplary embodiment, the wireless device 100 wirelessly connects with the cellular network. In turn, the cellular network may provide connectivity to the public switched telephone network ("PSTN") 102. The cellular network may also provide connectivity to a packet data serving node ("PDSN") 104, which in turn can provide connectivity to a packet-switched network, such as the Internet 106. Through this connectivity, the wireless device 100 may communicate with a device on one of these networks.

The wireless device 100 may be a cellular phone, a personal digital assistant ("PDA"), a wirelessly equipped computer or another wireless device. While FIG. 1 depicts one wireless device 100 connected to the cellular network, the cellular network may include a plurality of wireless devices 100. Also, more than one type of wireless device 100 may connect to the cellular network. For example, a cellular phone, a PDA and other devices could all be used to connect to the cellular network.

As shown in FIG. 1, the wireless device 100 links to a base transceiver station antenna ("base station") 108 through an air interface. The wireless device 100 can communicate with the base station 108 using a variety of different protocols. In an exemplary embodiment, the wireless device 100 communicates with the base station 108 using Code Division Multiple Access ("CDMA"), such as in a CDMA2000 3G packet data telecommunications network. CDMA provides a method for sending wireless signals between the wireless device 100 and the base station 108. In a CDMA system, the base station 108 communicates with the wireless device 100 over a spread spectrum of frequencies.

In a CDMA system, multiple wireless devices may use the same frequency range, and the multiple wireless devices may each simultaneously communicate with the base station 108 using the same frequency range. The wireless device 100 in a CDMA system spreads its signal across the frequency range. Spreading the signal across a wide bandwidth, such as approximately 1.266 MHz, can reduce interference between signals from different wireless devices. This can allow individual signals to be differentiated from other signals, and therefore, accurately recovered. In order to perform signal spreading, each wireless device may be assigned a unique code, such as a Walsh code. The code may be a sequence of bits, such as a 64 bit binary number; however, other lengths may also be used.

The wireless device 100 can transmit data by creating a modulated signal. The modulated signal may be created, for example, by modulating the wireless device's unique code with the data to be transmitted. In creating the modulated signal, the modulation bit rate of the code is ordinarily greater than the bit rate of the data. Once the modulated signal is created, it can then be sent over the common frequency range to the base station 108.

To accurately recover the modulated signal, the base station 108 can also store the unique code used by the wireless device 100. Then, the base station 108 can monitor the frequency range for signals having the modulation pattern of the wireless device's code. This allows the base station 108 to differentiate the signal of the wireless device 100 from the signals of other the other wireless devices, which can appear as noise. After recovering the modulated signal, the base station 108, or other device, can then recover the data from the modulated signal. For example, the base station 108 can demodulate the modulated signal using the unique code for the wireless device 100. Communication from the base station 108 to the wireless device can occur in a similar manner, although it may occur in a different frequency range.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other protocols may also be used for communication between the wireless device 100 and the base station 108. For example, the wireless device 100 and the base station 108 may communicate using Wideband CDMA ("WCDMA"), Time Division-Synchronous CDMA ("TD-SCDMA"), Advanced Mobile Phone Service ("AMPS"), Digital AMPS ("D-AMPS"), Global System for Mobile Communication ("GSM"), IS-136, Wireless Application Protocol ("WAP"), time division multiple access ("TDMA") or other protocols. Additional wireless protocols such as IEEE 802.11, Bluetooth and others may also be used.

The base station 108 couples to a base station controller ("BSC") 110, which can perform various functions such as managing handoffs of the wireless device 100 as it moves among base stations. The BSC 110 in turn connects to a mobile switching center ("MSC") 112. The MSC 112 can manage setup and teardown of connections with the wireless device 100. While the BSC 110 and the MSC 112 are depicted as separate components, it is possible that their functionality may be combined into a single component.

The MSC 112 may also include a visitor location register ("VLR"). The VLR may be used to track wireless devices that travel away from their "home" MSC to another MSC. The VLR may receive information about a roaming wireless device from the roaming wireless device's home MSC, and it may store that information. When the roaming wireless device travels away from the MSC, the VLR may then remove information about that roaming wireless device.

Additionally, the MSC 112 may connect to a home location register ("HLR") 114. The HLR 114 can be a database that can store subscription information for wireless devices. Also, the HLR 114 can track the current location of wireless devices. For example, when a wireless device roams away from its home MSC 112 to another MSC, the HLR 114 may be appropriately updated. Then, the HLR 114 can be used to route calls to the wireless device.

The MSC 112 can additionally provide connectivity to the PSTN 102. Using the connectivity, the wireless device 100 may then communicate with another device that is also connected to the PSTN 102. The wireless device 100 may also communicate with another device on the cellular network.

In addition to connecting to the MSC 112, the BSC 110 may also connect with a PDSN 104. The PDSN 104 can provide connectivity to a packet-switched network, such as the Internet 106, an intranet or another network. The PDSN 104 may connect to the Internet 106 through a firewall 116. The firewall 116 can be used to provide protection for the PDSN 104, for example by restricting access from the Internet 106 back through the firewall 116 to the PDSN 104. Once the wireless device 100 connects, for example, to the Internet 106, it can exchange data with other devices that are also connected to the Internet 106.

For example, the wireless device 100 may establish a Point-to-Point Protocol ("PPP") session with the PDSN 104. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher-level protocol options for communication between the two devices.

During the establishment of the PPP session, the PDSN 104 may access an Authentication Authorization and Accounting ("AAA") server 118. The AAA server 118 can authenticate the wireless device 100, for example using a network access identifier ("NAI") and a password provided by the wireless device 100. In addition to authorizing access, the AAA server 118 may also track the access of wireless device 100 to provide billing or other accounting functions. The PDSN 104 may communicate with the AAA server 118, for example, using a Remote Authentication Dial In User Service ("RADIUS") interface.

As a further part of establishing the PPP session, the wireless device 100 may be assigned an Internet Protocol ("IP") address. This may be done, for example, after the wireless device 100 has been authorized to access the cellular network. The IP address may be used by the wireless device 100 to communicate in data sessions with other devices. While the wireless device 100 may have a pre-assigned IP address, its IP address is usually assigned at connection time. This may be done, for example, by using a Dynamic Host Control Protocol ("DHCP") application program. The DHCP application program may run on the PDSN 104, or it may run on another element. When the wireless device 100 establishes a PPP session with the PDSN 104, the DHCP application program may assign the wireless device 100 an IP address to use for that connection.

PPP is described in more detail in Internet Engineering Task Force ("IETF") Request for Comments ("RFCs") 1661, 1662 and 1663, all of which are incorporated herein by reference in their entirety. DHCP is described in more detail in IETF RFCs 1541, 2131, 2132, which are all incorporated herein by reference in their entirety. RADIUS is described in more detail in IETF RFC 2138, which is incorporated herein by reference in its entirety. AAA is described in more detail in IETF RFC 2924, which is incorporated herein by reference in its entirety. More information on these and other IETF standards may be found at the URL "www.ietf.org."

Once connected to the PDSN 104, for example through a PPP session, the wireless device 100 can access the Internet 106. While the wireless device 100 may communicate with the PDSN 104 through a PPP session, it may communicate with other devices using higher-level protocols. For example, the wireless device 100 may use the Transmission Control Protocol ("TCP") and IP to communicate with other devices on the Internet 106. TCP/IP is one protocol suite that may be used for transmitting data over a packet-switched network. IP provides a method for transmitting data between devices on the same or on different networks. TCP is a connection-oriented protocol used to send data between devices connected over a network, and it provides additional features over IP, such as reliable end-to-end transmission of data. When used in conjunction, TCP and IP provide a format for breaking a data message into packets, transmitting the packets over the network to a receiver, and reassembling the packets at the receiver to form the original data message.

In IP communications, each device may be assigned an IP address, which is 32-bits long. The IP address assigned to a device is usually globally unique, and this allows data to be accurately sent between devices on different networks. Data to be transmitted between devices is placed into an IP packet. The IP packet can include a header portion and a data portion. The header portion generally identifies a source device and a destination device, while the data portion carries the data to be transmitted between the two devices.

Figure 2:
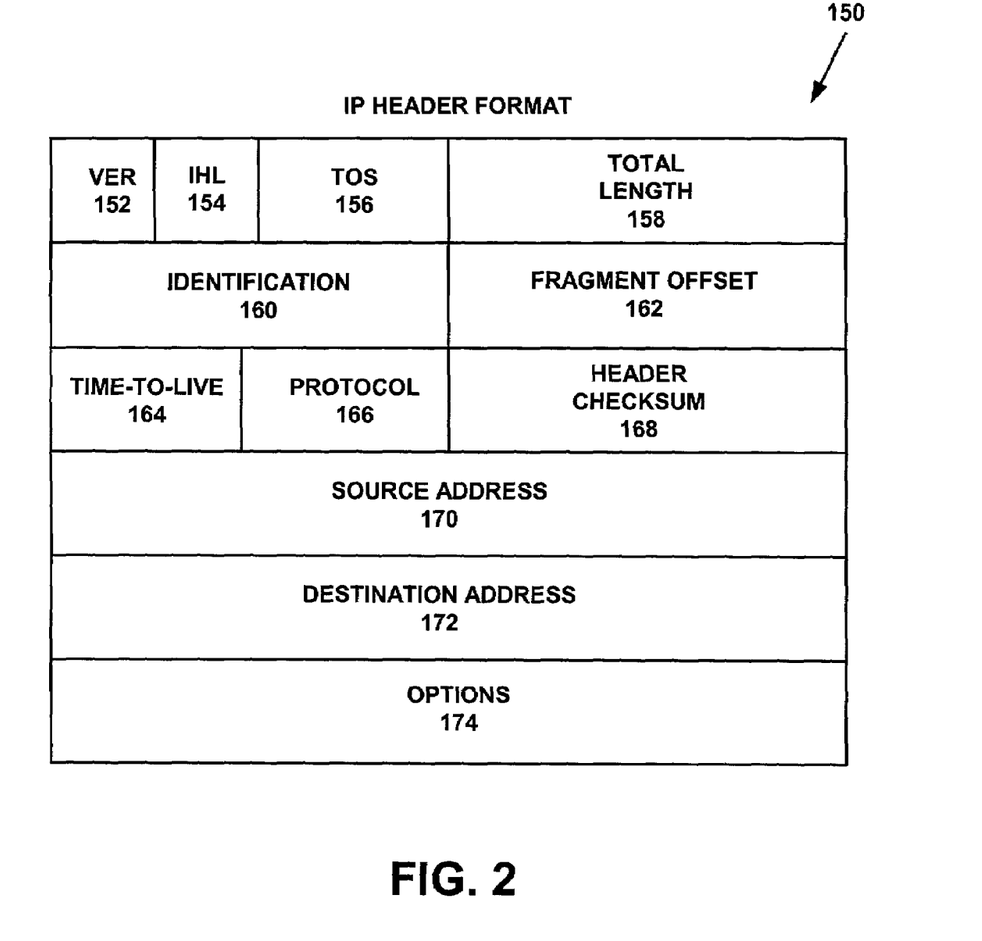
FIG. 2 is a block diagram illustrating an IP packet header.

FIG. 2 is a block diagram illustrating an IP packet header 150. The IP packet header 150 includes a number of different fields. The version field 152 can indicate an IP version, such as IPv4 or IPv6. The Internet Header Length ("IHL") field 154 can indicate the length of the header. The Type-of-Service ("ToS") field 156 can indicate a requested type of service. The total length field 158 can indicate the length of everything in the IP packet, including the IP header 150. The identification-field 160 may be used for packet fragmentation. The fragment offset field 162 can also be used for packet fragmentation. The Time-To-Live ("TTL") field 164 can be a hop count, which is used to limit the lifetime of the IP packet.

The protocol field 166 can indicate a protocol used with the IP packet. For example, TCP, User Datagram Protocol ("UDP"), Encapsulating Security Payload ("ESP"), and Authentication Header ("AH") are common protocols that may be used in conjunction with IP. Other protocols may be used as well. The header checksum field 168 can be used to verify the contents of the IP packet header 150. The source address field 170 may include a source IP address for a sending device, and the destination address field 72 may include an IP address for a receiving device. The options field 174 can be used for security, source routing, error reporting, debugging, time stamping or other information. IP data may be carried in the IP packet data portion, which is generally appended below the options-field 174.

The IP packet is sent over the network, and, using the IP address in the destination address field 172 of the IP packet header 150, appropriately routed to the destination device. The packet may travel through different devices and across different networks before ultimately reaching its destination. The IP address can help to provide accurate routing through the intermediate devices to the intended destination device.

IP, however, does not provide a mechanism to assure that packets will be received at their intended destination. They may be lost during transmission due to data corruption, buffer overflow, equipment failure or other problems. TCP complements IP by ensuring reliable end-to-end transmission of the packets. Among other functions, TCP handles lost or corrupted packets, and it reassembles packets that arrive at their destination out of order. IP is described in more detail in IETF RFC 791, which is incorporated herein by reference in its entirety. TCP is described in more detail in IETF RFC 793, which is incorporated herein by reference in its entirety.

TCP/IP is one method for sending data between two devices, and other Internet or network protocols may also be used. For example, the User Datagram Protocol ("UDP") may be used in conjunction with IP to exchange data between devices. UDP provides a connectionless protocol for exchanging data between devices, such as devices connected over an IP network. UDP does not guarantee reliable transmission between the devices, and it provides only minimal error protection. UPD is described in further detail in IETF RFC 768, which is incorporated herein by reference in its entirety.

Once connected to the cellular network for a data session, such as by starting a PPP session with the PDSN 104 and receiving an IP address, the wireless device 100 may communicate with a network device 122. The network device 122 can be located on the Internet 106, the cellular network or another network. The network device 122 and the wireless device 100 can both use the Session Initiation Protocol ("SIP") to establish a session between them. A SIP server 124 can be used to route messages between the two devices in order to establish a session between the two devices. While FIG. 1 depicts a single network device 122, the wireless device 100 may communicate with multiple network devices. The multiple network devices may be located at various different locations, such as on the Internet 106, the cellular network or another connected network.

The SIP server 124 may also be located at a variety of different locations. In one embodiment, as shown in FIG. 1, the SIP server 124 is located on the Internet 106; however, it may also be located on another network accessible by the wireless device 100. In an alternate embodiment, the SIP server 124 connects directly to the PDSN 104. In yet another embodiment, the SIP server 124 is located at another location in the cellular network that is accessible by the wireless device 100.

The SIP server 124 can support a number of different SIP functions. For example, the SIP server 124 can perform the functions of a SIP registrar server and a SIP proxy server. The SIP server 124 may also perform other functions. These various functions may all be included in the SIP server 124, as shown in FIG. 1. Alternatively, the functions may be distributed among two or more servers. For example, the cellular network may include separate SIP registrar and SIP proxy servers. The two servers may be located on the Internet 106, on the cellular network or on another network accessible by the wireless device 100. Of course, the functionality may be split between more than two servers, and the servers may each be located at different locations.

The SIP server 124 can act as an intermediary between the wireless device 100 and the network device 122, and the SIP server 124 can aid in establishing the session between the wireless device 100 and the network device 122. For example, the network device 122 may identify the wireless device 100 using a static identifier, such as an e-mail address. While the network device 122 may know the static identifier for the wireless device 100, the current routable address for the wireless device 100 may continually change. The SIP server 124 can resolve the static identifier into the wireless device's current routable address, such as its IP address, thereby allowing the network device 122 to send data to the wireless device's current location.

Generally, a SIP client, such as an application program, runs on the wireless device 100. The SIP client registers its current location with the SIP server 124, such as by sending the SIP server 124 its current IP address. Using the current addressing information stored by the SIP server 124, the network device 122 can contact the SIP client to establish a data session with the wireless device 100. For example, the SIP server 124 can receive SIP messages from the network device 122 that are addressed to the SIP client on the wireless device 100 using a static identifier. Then, the SIP server 124 can forward the SIP messages received from the network device 122 to the SIP client on the wireless device 100 using the wireless device's current IP address.

In another example of using the SIP server 124 to establish a SIP session between the wireless device 100 and the network device 122, the SIP server 124 can receive a request from the network device 122 for the current location of the SIP client. The request may identify the SIP client using a static identifier. In response to the message, the SIP server 124 may provide the network device 122 with the wireless device's current IP address. Then, the network device 122 can send SIP messages directly to the wireless device 100 using the wireless device's IP address. SIP is described in more detail in IETF RFC 2543, which is incorporated herein by reference in its entirety.

The IP address assigned to the wireless device 100, and which may be used for SIP communications, is generally associated with the wireless device's home network. However, as is common, the wireless device 100 may roam to one or more different networks. Mobile IP is an extension of IP that allows the wireless device 100 to move transparently move between different "foreign" networks while still receiving data addressed to the IP address associated with the wireless device's home network. Using Mobile IP, the wireless device's movement away from its home network can appear transparent to protocol layers above IP (e.g., TCP or UDP).

Figure 3:
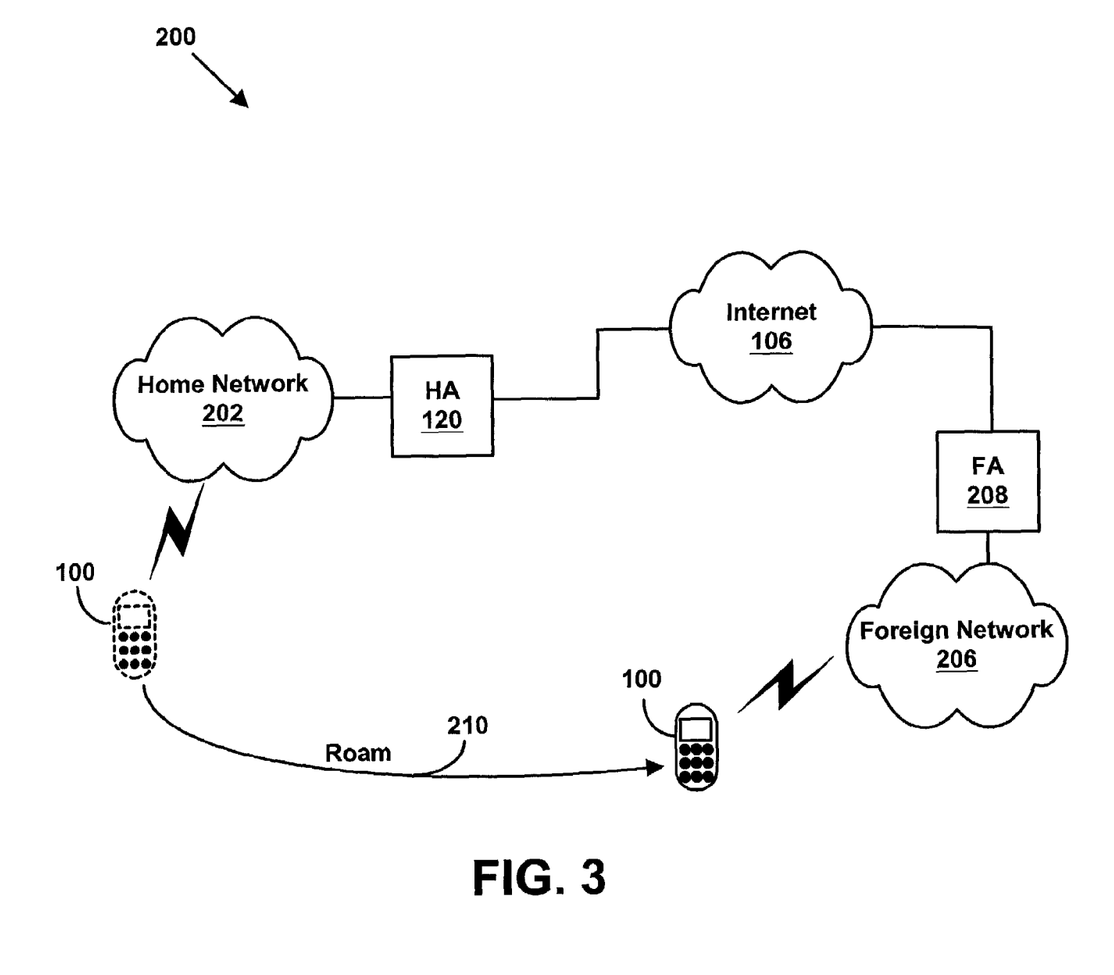
FIG. 3 is a block diagram illustrating an exemplary Mobile Internet Protocol system.

FIG. 3 is a block diagram illustrating an exemplary Mobile IP system 200. The Mobile IP system 200 includes the wireless device 100, referred to in Mobile IP terminology as a mobile node 100. The mobile node 100 can connect a home network 202, such as the cellular network of FIG. 1. The home network 202 can in turn connect to an external network 106, such as the Internet or an intranet, via a home agent ("HA") 120. The home agent 120 can be a gateway router for the home network 202. As is known in the art, a gateway can connect networks that use different networking protocols or operate at different transmission capacities. As is also known in the art, a router can translate differences between network protocols and can route data packets to an appropriate network node or network device. By connecting to the home network 202, the mobile node 100 can communicate with devices connected to the Internet 106.

As indicted by the dashed outline, the mobile node 100 may "roam" away from its home network 202 and connect to a foreign network 206, such as another exemplary cellular network as depicted in FIG. 1. For example, the mobile node 100 may roam away from the home network 202 to the foreign network 206 as illustrated by path 210. When the mobile node 100 roams away from its home network 202, it periodically transmits Mobile IP "agent solicitation" messages to foreign agents, such a the foreign agent ("FA") 208 for the foreign network 206. The foreign agent 208 is foreign with respect to the mobile node's home network 202.

The foreign network 206 may also include one or more mobile nodes for which the foreign network 206 serves as the home network; however, no such mobile nodes are depicted in FIG. 3. The foreign agent 208 resides on a foreign network 206. The foreign agent 206, similarly to the home agent 120, can be a gateway router for the foreign network 206. The foreign agent 208 may be a separate component on the foreign network 206, or its functionality may be integrated into an existing component such as a PDSN.

As the mobile node 100 travels away from its home network 202, it may connect to a foreign network 206. The roaming mobile node 100 listens for mobile IP "agent advertisement" messages from foreign agents (i.e., foreign gateway routers such as the foreign agent 208). The agent advertisement messages can indicate that the roaming mobile node 100 is now on a foreign network 206. When the roaming mobile node 100 receives an agent advertisement message from a foreign agent, such as foreign agent 208, the mobile node 100 can register with the foreign agent (e.g., foreign agent 208) and also with its home agent (e.g., home agent 120). The registration can indicate that the mobile node 100 has roamed away from its home network 202 to a foreign network 206.

The mobile node 100 uses its home global address, such as its IP address, on the home network 202 to register with the foreign agent 208 and with the home agent 120. After registration of the mobile node 100, the foreign agent 208 may accept data packets for the mobile node 100 at the specific home global address for the mobile mode 106 in addition to data packets for other devices on the foreign network 206. The foreign agent 208 may also assign a temporary subnet network address on the foreign network 206 to the mobile node 100.

Figure 4:
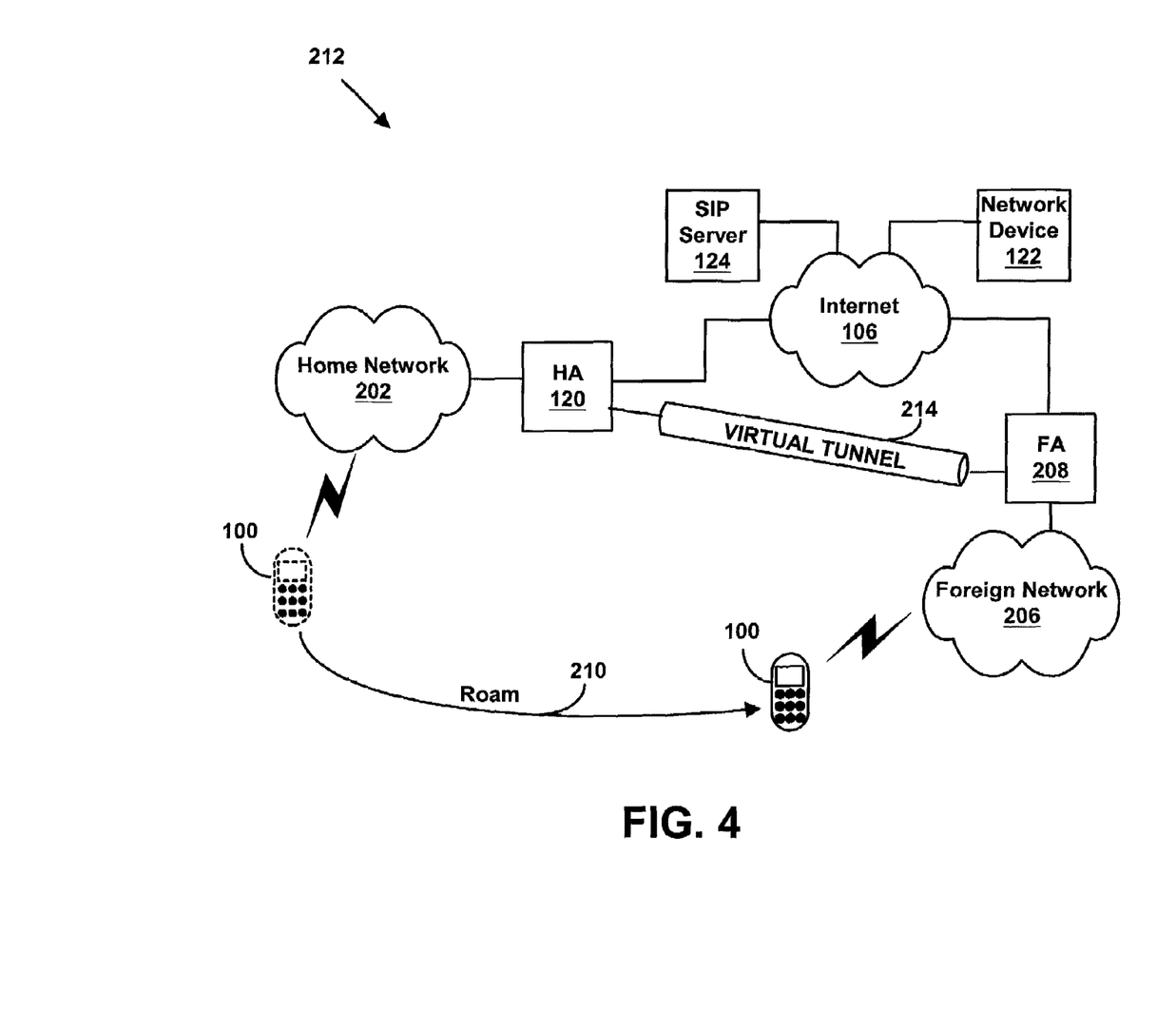
FIG. 4 is a block diagram illustrating exemplary Mobile Internet Protocol communications in the Mobile Internet Protocol system of FIG. 3.

FIG. 4 is a block diagram illustrating exemplary Mobile IP communications in an exemplary Mobile IP system 212. Once the mobile node 100 roams to the foreign network 206 and registers its current location (e.g., on the foreign network 206 and on the home network 202), the home agent 120 may create a "virtual tunnel" 214 to the foreign agent 208 via the external network 204. The virtual tunnel 214 is not an additional physical connection created between the foreign agent 208 and the home agent 120, but rather the virtual tunnel 214 represents a conceptual data path for transmitting data between the home agent 120 and the foreign agent 208. The virtual tunnel 214 can be created by encapsulating a data packet inside another data packet and by adding additional tunnel packet headers. In one embodiment, IP-in-IP tunneling can be used. Other types of virtual tunnels, such as UDP tunneling or double IP-in-IP tunneling, can also be created, and these may also be used.

The network device 122 can send a data message addressed to the mobile node 100. This may be done, for example, by sending the mobile node 100 a packet addressed to its globally routable IP address. The packet travels through the Internet 106 and is routed to the home agent 120. The home agent 120 accepts packets addressed to IP addresses for devices in the home network 202. If the mobile node 100 were connected to the home network 202, the home agent 120 would forward the packet to the mobile node 100. However, the mobile node 100 is not connected to the home network 202. The mobile node 100 is connected to the foreign network 206, and the packet is forwarded from the home agent 120 to the foreign network 206.

The mobile node 100 previously registered its new location with the home agent 120 and with the foreign agent 208. The home agent 120 encapsulates the packet addressed to the mobile node 100 into a tunnel packet, which is sent to the foreign agent 208 through the virtual tunnel 214. When the foreign agent 208 receives the tunnel packet, it removes the tunnel packet header and routes the packet to the mobile node 100.

With specific reference to SIP communications, the network device 122 can send a SIP message to the SIP server 124. The SIP server 124 can be associated with the home network of the mobile node 100. Advantageously, associating the SIP server 124 with the mobile node's home network can provide the network device 122 with a single point of contact for the mobile node 100. While the mobile node 100 may use Mobile IP to roam to various different foreign networks, the mobile node's movement can appear transparent to the network device 122.

The SIP message can be received by the SIP server 124 and forwarded to the home network 202 for the mobile node 100. Once received at the home network 202 by the mobile node's home agent 120, the SIP message can be encapsulated and sent through the virtual tunnel 214 to the foreign agent 208. The foreign agent 208 can unencapsulate the SIP message and send it to the mobile node 100 at its current location on the foreign network 206.

Similarly, the network device 122 can request the mobile node's current address, and the SIP server 124 may provide the network device 122 with the mobile node's current IP address. The network device 122 may then use the IP address to send a packet directly to the mobile node 100. The packet would be routed to the mobile node's home network 202. Once received at the home network 202, the packet may be sent through the virtual tunnel 214 to the foreign agent 208. The packet can then be unencapsulated and sent to the mobile node 100 at its location on the foreign network 206.

Mobile IP is described in more detail in IETF RFCs 2002 and 2005, each of which is incorporated herein by reference in its entirety. IP-in-IP tunneling is described in more detail in the IETF RFC 1853, which is incorporated herein by reference in its entirety. Mobile IP tunneling and data encapsulation are also discussed in IETF RFCs 2003 and 2004, each of which is incorporated herein by reference in its entirety.

2. Exemplary Operation

The wireless device 100 can connect to the cellular network and register with the SIP server 124. The SIP server 124 can notify another network entity of the wireless device's registration with the SIP server 124. Once the wireless device 100 registers with the SIP server 124, the SIP server 124 can be used to establish a session between the wireless device 100 and the network device 122. Eventually, the wireless device may deregister from the SIP server 124 and disconnect from the cellular network. The wireless device 100, however, may disconnect from the cellular network without first deregistering from the SIP server 124, such as can occur when the wireless device 100 abnormally disconnects from the cellular network. In response, another entity may deregister the wireless device 100 from the SIP server 124.

An abnormal disconnection may occur, for example, when the wireless device 100 encounters interference over the air interface with the base station 108 that causes the wireless device 100 to lose its connection with the cellular network. In another example of an abnormal disconnection, the wireless device 100 may lose power and, in turn, lose its connection with the cellular network. In yet another example, the wireless device 100 may be abruptly turned off, thereby also causing the wireless device to lose its connection with the cellular network. Of course other causes for abnormal terminations also exist.

The abnormal termination generally occurs quickly, thereby potentially leaving the wireless device 100 with insufficient time to gracefully terminate its sessions with the cellular network. For example, the wireless device 100 may lack the necessary time to end its PPP session with the PDSN 104, and it may lack the time necessary to deregister from the SIP server 124. In response to the abnormal disconnection of the wireless device 100 from the cellular network, a network entity other than the wireless device 100 can deregister the wireless device 100 from the SIP server 124.

Figure 5:
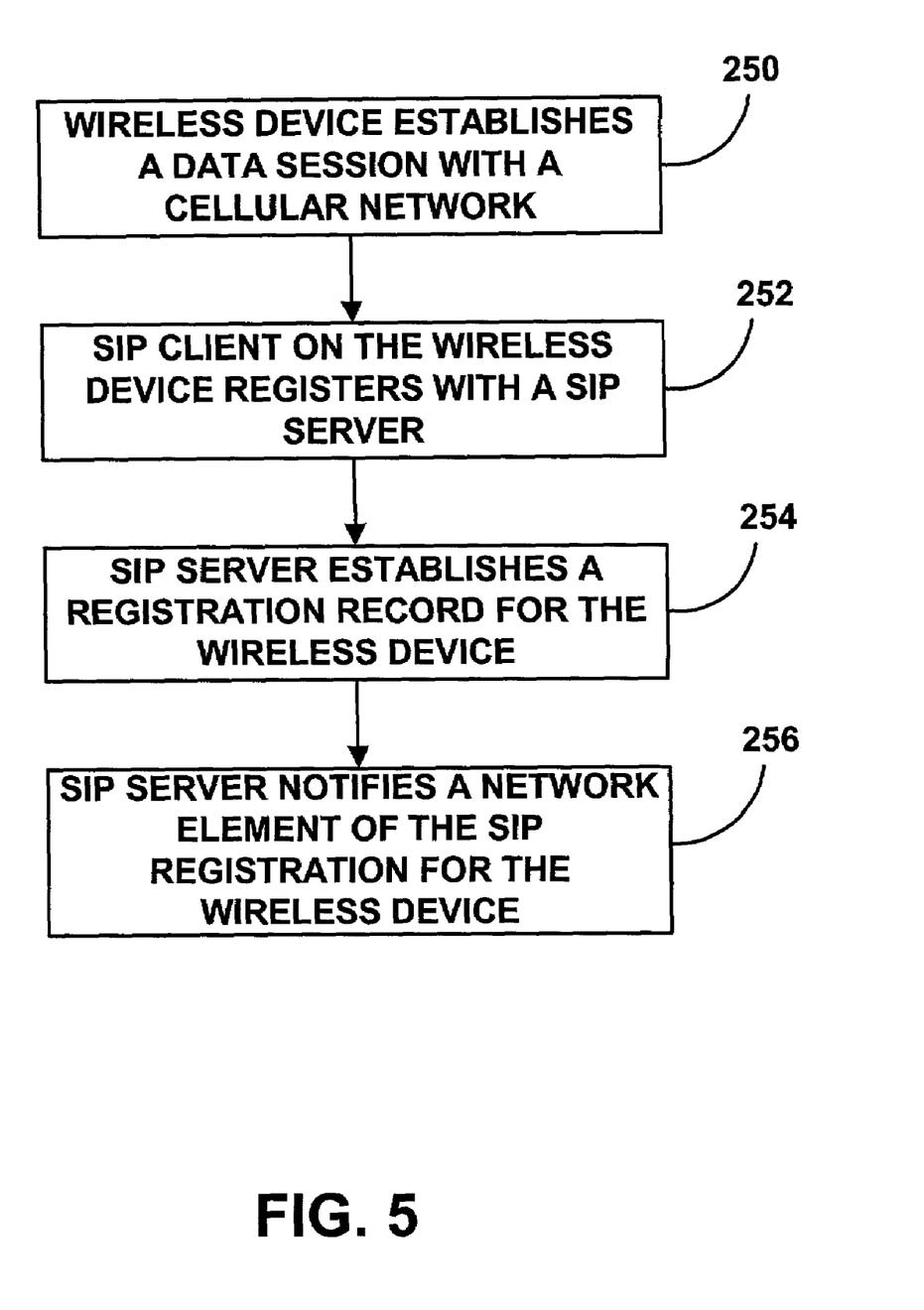
FIG. 5 is a flowchart of an exemplary process for registering with a SIP server.

FIG. 5 is a flowchart of an exemplary process for registering the wireless device 100 with the SIP server 124 and notifying a network entity of the wireless device's registration. At Step 250, the wireless device 100 establishes a data session with the cellular network. For example, the wireless device 100 may access the cellular network and establish a PPP session with the PDSN 104. The wireless device 100 may be authorized to access the cellular network, and the AAA server 118 may start an accounting record for the wireless device 100. Additionally, the wireless device 100 may be assigned an IP address, which it can use to exchange data with other devices.

Next, at Step 252, a SIP client running on the wireless device 100 registers with the SIP server 124. The SIP client may be, for example, an application program running on the wireless device 100. In one exemplary embodiment, the SIP client may automatically register with the SIP server 124 upon establishing a PPP session with the PDSN 104 and receiving an IP address. In another exemplary embodiment, the SIP client may register with the SIP server 124 in response to an indication from a user of the wireless device 100. For example, the user may make an entry into a user interface of the wireless device 100 that signals the SIP client to register with the SIP server 124.

The SIP server 124 may include the functionality of a SIP registrar server. The registrar server receives registration requests from SIP clients. In response to a registration request from the SIP client running on the wireless device 100, the SIP registrar server stores location information for the SIP client. For example, the SIP server 124 may receive and store the current IP address assigned to the wireless device 100 and used by the SIP client.

The SIP client may register with the SIP server 124 in a variety of different ways. In one exemplary embodiment, the SIP client sends a SIP REGISTER request via the PDSN 104 to the SIP server 124. The SIP REGISTER request may carry one or more identifiers for the wireless device 100. For example, the SIP REGISTER request may carry a network access identifier ("NAI"), a mobile identification number ("MIN"), an electronic serial number ("ESN"), an IP address or other identifying information for the wireless device. In one exemplary embodiment, the SIP REGISTER request includes the wireless device's NAI, MIN and IP address. Other course, other identifiers or combinations of identifiers may also be used.

As is known in the art, an NAI is one method for identifying a device. The NAI can be, for example, a userID submitted by the wireless device 100 during its PPP session authentication. While the NAI can take various different forms, in one exemplary embodiment the NAI can take the form of an e-mail address. In addition to identifying the wireless device 100, the NAI also provides a way for the wireless device 100 to be identified and to receive data as it roams away from its home service area. NAI is described in more detail IETF RFC 2486, which is incorporated herein by reference in its entirety.

As is known in the art, a MIN is a 24-bit number corresponding to the actual seven-digit telephone number assigned to a wireless device, such as a cellular phone. The MIN can be changeable as the wireless device changes owners or telephone numbers. The MIN may optionally be used in conjunction with an electronic serial number ("ESN") to identify the wireless device. As is known in the art, an ESN is a unique 32-bit binary number assigned to the wireless device.

At Step 254, the SIP server 124 establishes a registration record for the SIP client in response to the registration request. In one exemplary embodiment, the SIP server 124 may create the registration record by making an entry in a database. The database entry can store the present location of the SIP client as identified by the SIP REGISTER request, and it may store other information. In another exemplary embodiment, the SIP server 124 may update a location server, which can also be a type of database. The location server may be a part of the SIP server 124, or it may be a separate element. The location server may store current location information about the SIP client, and it may store other information, such as network routing information, locations of proxies, locations of gateways, preference information, or other information.

Upon registration with the SIP server 124, such as by sending a SIP REGISTER request, the SIP server 124 determines an expiration values and assigns the expiration value to the SIP client's registration. The expiration value may be, for example, an amount of time that the SIP server 124 should maintain the requested registration. In one example of determining the expiration value, the expiration value may be included in the SIP REGISTER request. In another example, it may be a default value programmed into the SIP server 124. After determining the expiration value, the SIP server 124 may start an expiration timer corresponding to the amount of time to maintain the SIP registration.

Generally, the expiration timer marks the duration of the SIP registration, and eventually, the expiration timer may expire. In response to the expiration of the expiration timer, the SIP server 124 may remove the registration for the wireless device 100. The wireless device 100, however, may want to extent its registration past the initial expiration value set by the SIP server 124. The wireless device 100 can extend its SIP registration past the expiration value by sending the SIP server 124 a new SIP REGISTER request. The new SIP REGISTER request can reset the expiration timer and thereby extend the wireless device's registration. The wireless device 100 may also end its registration by sending the SIP server 124 a SIP REGISTER request will a zero or small expiration value, which would cause the expiration timer to quickly expire and the wireless device 100 to be deregistered.

At Step 256, the SIP server 124 notifies a network element of the SIP registration for the wireless device 100. In one exemplary embodiment, the SIP server 124 notifies the AAA server 118 of the SIP registration for the wireless device 100. For example, the SIP server 124 can send the AAA server 118 a SIP SUBSCRIBE request. The SIP SUBSCRIBE request may be used to request notification when an event occurs, and, in turn, a SIP NOTIFY message can be used to signal that the event has occurred.

In one exemplary embodiment, the SIP server 124 sends the AAA server 118 a SIP SUBSCRIBE request that requests notification when the wireless device 100 abnormally disconnects from the cellular network. The SIP SUBSCRIBE request sent to the AAA server 118 may include identifying information for the wireless device 100. For example, the SIP SUBSCRIBE request may include an NAI, MIN and IP address for the wireless device 100; however, other combinations of identifiers may also be used. The SIP SUBSCRIBE request can additionally include information about the event that would trigger a notification to the SIP server 124.

The AAA server 118 can be advantageously enabled to receive messages, such as SIP SUBSCRIBE messages, from the SIP server 124, because the AAA 118 may be easily programmed to exchange messages with the SIP server 124. Of course other network elements may also be used to receive the notification from the SIP server 124. For example, the PDSN 104 may be programmed to receive notifications from the SIP server 124. In another example, the cellular network may use another programmable element to receive notifications from the SIP server 124.

Figure 6:
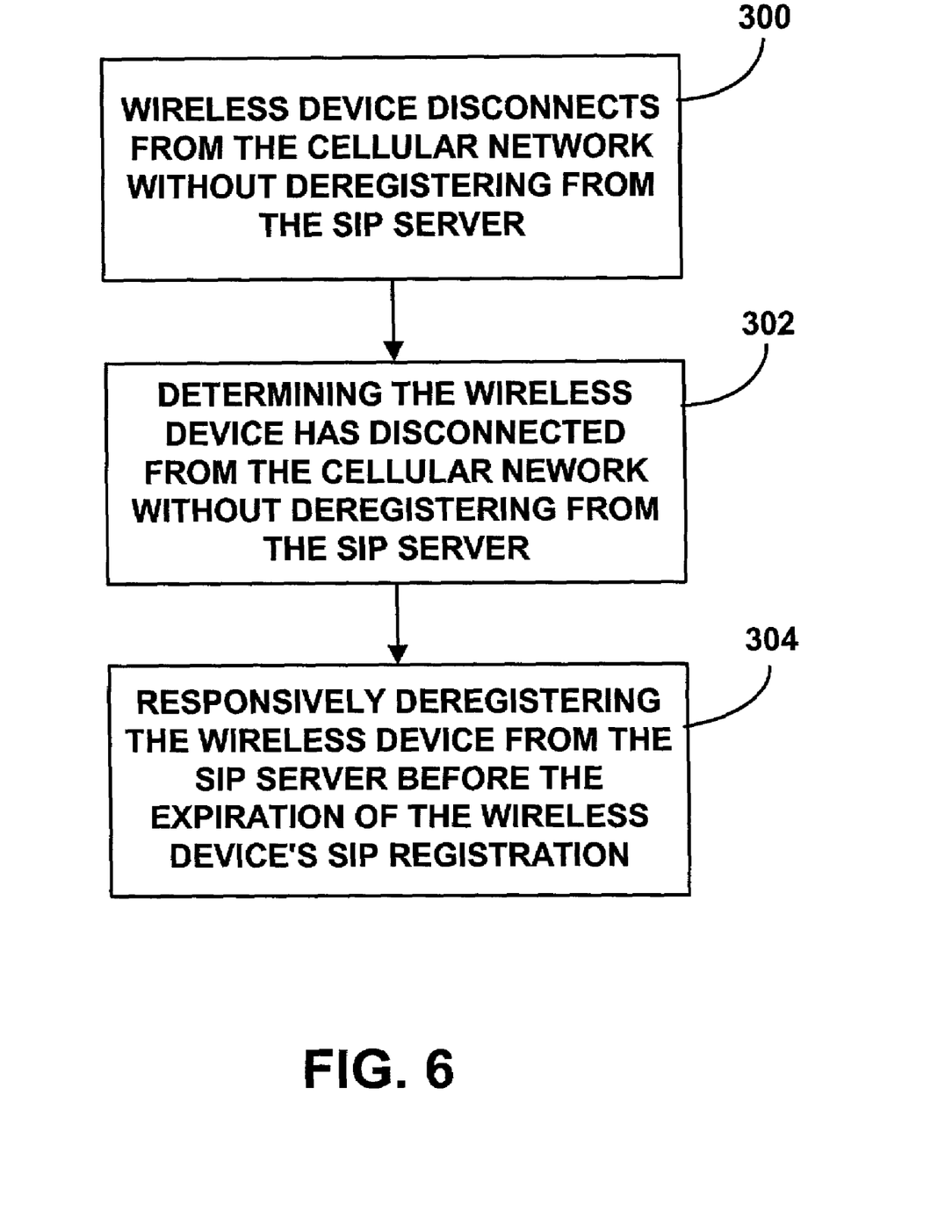
FIG. 6 is a flowchart of an exemplary process for deregistering the wireless device from the SIP server.

In response to an abnormal termination or other event, a network entity other than the SIP client can deregister the wireless device 100 from the SIP server 124. FIG. 6 is a flowchart of an exemplary process for deregistering the wireless device 100 from the SIP server 124. At Step 300, the wireless device 100 disconnects from the cellular network without deregistering from the SIP server 124. This may be, for example, due to an abnormal termination of the wireless device's connection with the cellular network.

Next, at Step 302, a network entity determines that the wireless device 100 has disconnected from the cellular network and also determines that the wireless device 100 did not deregister from the SIP server 124. This may be done in a variety of different ways. In one embodiment, the network entity may be the PDSN 104, the AAA server 118 or another element capable of detecting the wireless device's disconnection from the cellular network. The network entity may, for example, detect an abnormal termination of the connection with the wireless device 100. For example, the PDSN 104 may detect an abnormal disconnection of the wireless device 100, and the PDSN 104 may notify the AAA server 118 by sending the AAA server 118 a "stop accounting" message. The stop accounting message can indicate that the AAA server 118 should stop billing the wireless device 100 for its most recent connection, and it can also signal that the wireless device 100 has disconnected from the cellular network. Of course, these examples are merely exemplary in nature, and other ways may also exist.

Then, at Step 304, a network entity other than the SIP client responsively deregisters the wireless device 100 from the SIP server 124 before the expiration of the wireless device's SIP registration. For example, the network entity may determine that the wireless device 100 has disconnected from the cellular network, and in response to the determination, the network entity may send a message to the SIP server 124. In response to the message, the SIP server 124 may then deregister the wireless device 100.

Responsively deregistering the wireless device 100 from the SIP server 124 before the expiration of its SIP registration can be advantageous for several reasons. For example, responsively deregistering the wireless device 100 can increase the performance of the SIP server 124. The deregistration may reduce the amount of time the SIP server 124 spends unnecessarily processing messages to send to the disconnected wireless device 100. This can increase the speed with which the SIP server 124 can process messages destined for connected devices. In another example, the deregistration can reduce the amount of traffic on the network destined for the disconnected wireless device 100. Decreasing the amount of traffic can increase the transmission rates for other connected devices. Of course, these advantages are merely exemplary in nature, and other advantages also exist.

Not using responsive deregistration for a wireless device 100 can have several disadvantages. For example, the wireless device 100 may disconnect from the cellular network without first deregistering from the SIP server 124, and the SIP server 124 may continue to maintain an active registration for the wireless device 100. This may be, for example, because the wireless device 100 abnormally terminated its session without first sending the SIP server 124 an indication to deregister the wireless device 100. Although the SIP server 124 may automatically deregister the wireless device 100 upon expiration of the expiration timer, the expiration timer may remain active for a period of time after the disconnection. The period of time in which the wireless device continues to be registered with the SIP server 124 but is disconnected from the cellular network may create problems within the network.

For example, during this time the SIP server 124 may receive a SIP INVITE message for the wireless device 100. Another device may use the SIP INVITE message, for example, to attempt to establish a SIP session with the disconnected wireless device 100. In response to the SIP INVITE message, the SIP server 124 may responsively cause a communication to be directed to the disconnected wireless device 100, such as by attempting to send the SIP INVITE message directly to the disconnected wireless device 100 or by providing a current address to the other device so that it may attempt to send the SIP INVITE message directly to the disconnected wireless device 100.

In one example of directing a communication to the disconnected wireless device 100, the SIP server 124 may forward the request to the wireless device 100, such as by sending the SIP INVITE message to the IP address of the wireless device 100. In another example, in response to the SIP INVITE message, the SIP server 124 may send current location information, such as the wireless device's IP address, to the sender of the SIP INVITE message. The sender of the SIP INVITE message can then send the SIP INVITE message directly to the wireless device 100 using the current location information obtained from the SIP server 124. The disconnected wireless device 100, however, will not successfully receive these messages, because the disconnected wireless device 100 is disconnected from the cellular network and unable to receive data.

By sending messages to the disconnected wireless device 100 that will never be received by the disconnected wireless device 100, the SIP server 124 may be inefficiently using its processing time. While the SIP server 124 attempts to send the messages, it may unnecessarily delay processing requests and messages for other devices that are still actively connected to the network. This can create a delay in processing and sending information between the connected devices. Additionally, attempting to send messages to the disconnected wireless device 100 creates additional data traffic on the network. The additional traffic on the network can slow down transmission rates within the network. The decreased transmission rates can adversely affect data exchange between connected devices on the network.

Therefore, the responsive deregistration of the wireless device 100 can advantageously counter the problems caused by maintaining the SIP registration while the wireless device 100 is disconnected, such as during the time between the abnormal disconnection of the wireless device 100 and the lapse of its expiration timer. For example, the responsive deregistration can increase the speed with which the SIP server 124 processes other requests. It can also increase the bandwidth on the cellular network or on other connected networks. Of course, other advantages also exist.

Figure 7:
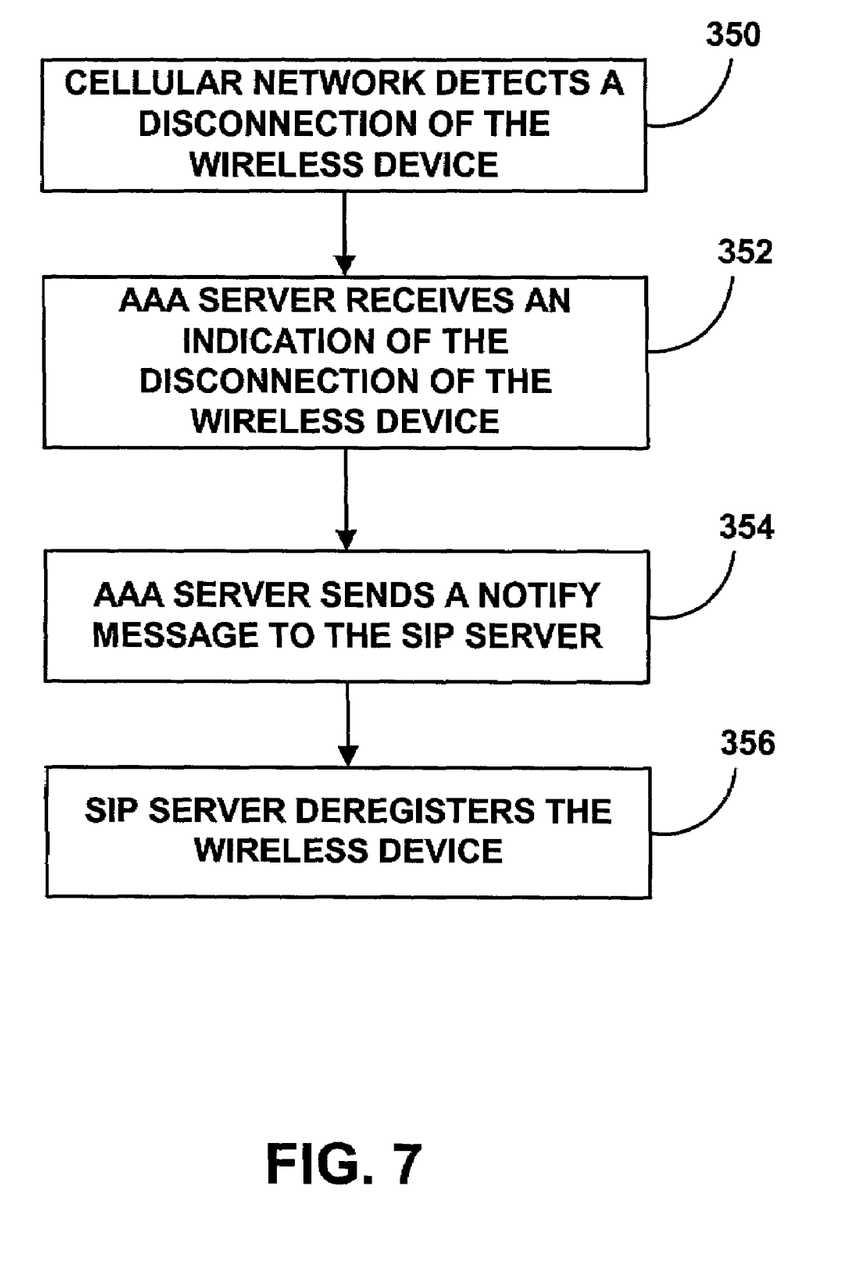
FIG. 7 is a flowchart of an exemplary process for responsively deregistering the wireless device from the SIP server.

FIG. 7 is a flowchart of an exemplary process for responsively deregistering the wireless device 100 from the SIP server 124. At Step 350, the cellular network detects a disconnection, such as an abnormal disconnection, of the wireless device 100. In one example of detecting an abnormal disconnection, the PDSN 104 may periodically receive "keepalive" messages from the wireless device 100, the BSC 110 or another element. The keepalive messages may be used to reset a timer kept by the PDSN 104 for the wireless device's PPP session. Upon expiration of the timer, such as caused by not receiving a keepalive message, the PDSN 104 may then terminate the PPP session with the wireless device. The PPP session timer used by the PDSN 104 may be various different lengths, but in one exemplary embodiment, the PPP session timer is significantly less than the SIP registration expiration timer. For example, the SIP registration expiration timer may have a value of approximately 30 minutes, while the value of the PPP session timer may be approximately five seconds. Of course, these values are merely exemplary in nature, and other values may also be used. Additionally, many other ways exist to detect an abnormal termination, and those may also be used.

Then, at Step 352, the AAA server 118 receives an indication of the disconnection of the wireless device 100. For example, the AAA server 118 may receive a "stop accounting" message from the PDSN 104. The stop accounting message may indicate to the AAA server 118 that the wireless device 100 has ended its session with the PDSN 104 and that the AAA server 118 should stop billing the wireless device 100. Of course, the AAA server 118 may receive another type of indication from the PDSN 104 or from another element.

At Step 354, the AAA server 118 sends a SIP NOTIFY message to the SIP server 124. This may be done, for example, in response to the stop accounting message received from the PDSN 104. The SIP server 124 may have previously sent the AAA server 118 a SIP SUBSCRIBE request, which may indicate that the AAA server 118 should notify the SIP server 124 if the wireless device 100 abnormally terminates its connection with the cellular network. The SIP SUBSCRIBE request may also have indicated identifying information for the wireless device 100, such as its NAI, MIN and IP address. Of course, the SIP SUBSCRIBE request may use different identifying information. The SIP NOTIFY message sent to the SIP server 124 may identify the wireless device 100, such as by using its NAI, MIN, IP address or other identifying information, and it may signal the SIP server 124 that the wireless device 100 has disconnected from the cellular network.

Then, the SIP server 124 can receive the SIP NOTIFY message from the AAA server 118 and responsively deregister the wireless device 100, as shown at Step 356. By receiving the SIP NOTIFY message from the AAA server 118 in response to the abnormal connection, the SIP server 124 can advantageously deregister the wireless device 100 before the expiration of the wireless device's SIP registration timer.

Figure 8:
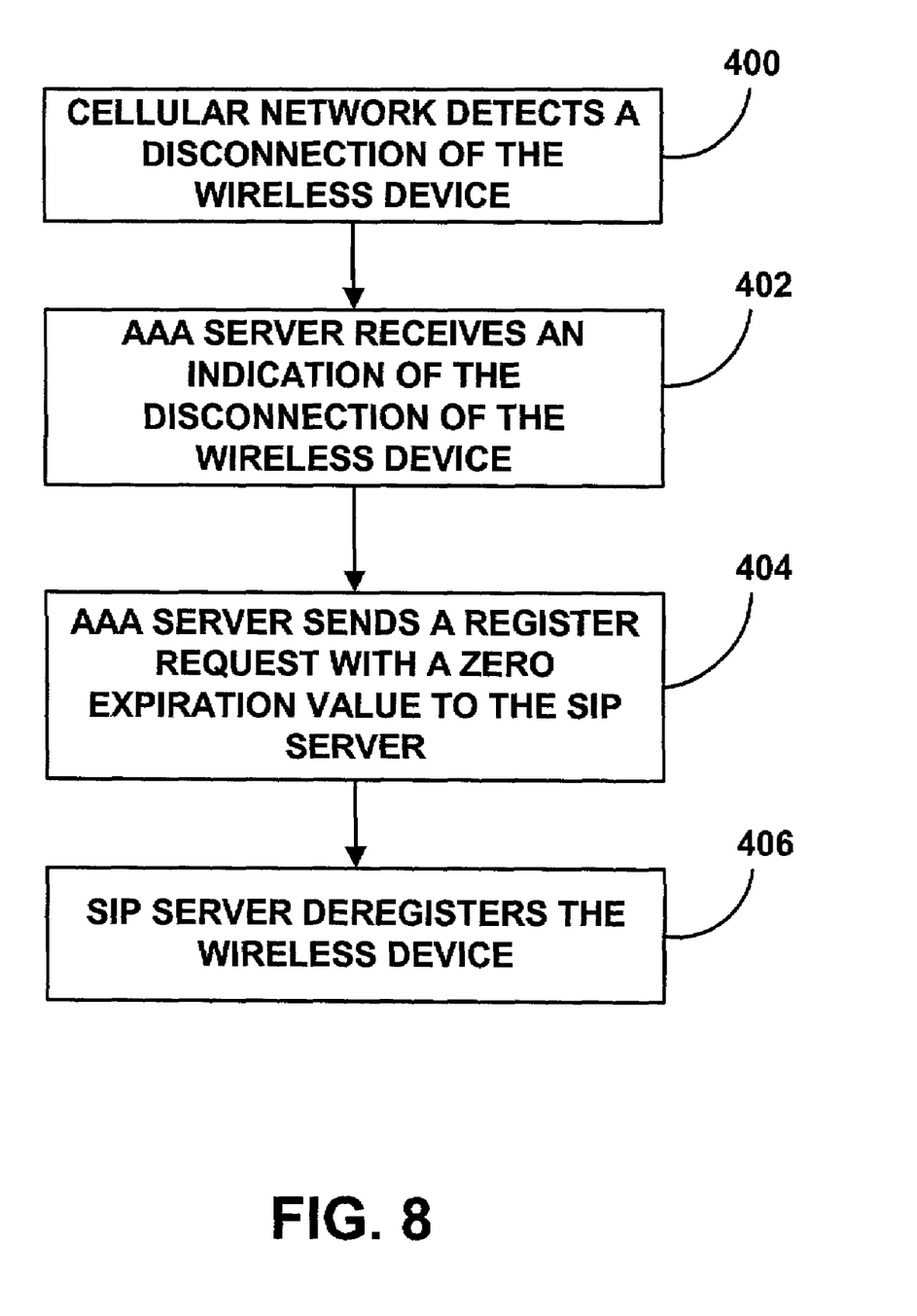
FIG. 8 is a flowchart of an alternate exemplary process for responsively deregistering the wireless device from the SIP server.

FIG. 8 is a flowchart of another exemplary process for responsively deregistering the wireless device 100 from the SIP server 124. At Step 400, the cellular network detects a disconnection of the wireless device 100. As previously described, the cellular network may detect an abnormal disconnection of the wireless device 100 such that the wireless device did not deregister from the SIP server 124 prior to the wireless device's disconnection. Then, at Step 402, the AAA server 118 receives an indication of the disconnection of the wireless device 100, such as stop accounting message from the PDSN 104.

Next, at Step 404, the AAA server 118 sends a SIP REGISTER request with a zero expiration value to the SIP server 124. The AAA server 118 may have previously received an indication from the SIP server 124, or from another source, identifying the SIP registration of the wireless device 100. For example, the AAA server 118 may have received a SIP SUBSCRIBE request that identified the wireless device 100. Other types of indications may also be used.

In response to the SIP REGISTER request, the SIP server 124 may deregister the wireless device 100, shown at Step 406. For example, the SIP server 124 may set the expiration timer to the zero expiration value indicated by the SIP REGISTER request. The zero expiration value may then cause the expiration timer to expire and the wireless device 100 to be deregistered.

In another embodiment, the SIP REGISTER request may include an expiration value other than zero. For example, the SIP REGISTER request may include an expiration value on the order of a few seconds. The SIP server 124 may then set the expiration timer to the value indicated by in the SIP REGISTER request. The small value indicated by the SIP REGISTER request would then cause the expiration timer to quickly expire and the wireless device 100 to be deregistered.

Of course, these deregistration processes are merely exemplary in nature, and many variations may be made. In an alternate embodiment, the AAA server 118, or another network element, may be notified of the wireless device's SIP registration by a network element other than the SIP server 124. For example, after registering with the SIP server 124, the wireless device 100 may send the AAA server 118 a notification of its registration with the SIP server 124. The notification may be sent directly from the wireless device 100 to the AAA server 118. Alternatively, the notification may be sent to the PDSN 104, which can in turn notify the AAA server 118. Of course, other ways also exists to notify the AAA server 118 of the wireless device's registration with the SIP server 124.

In another alternate embodiment, the SIP server may receive an indication of the abnormal termination from a device other than the AAA server 118. For example, after the wireless device 100 registers with the SIP server 124, the SIP server 124 may send a SIP SUBSCRIBE request to the PDSN 104. The SIP SUBSCRIBE request may identify the wireless device 100, and it may request notification to the SIP server 124 if the wireless device disconnects from the cellular network. Then, in response to ending the PPP session with the wireless device 100, the PDSN 104 may send an indication, such as a SIP REGISTER request or a SIP NOTIFY message, to the SIP server 124. After receiving the indication from the PDSN 104, the SIP server 124 may deregister the wireless device 100. Of course, network elements other than the AAA server 118 or the PDSN 104 may also be used to notify the SIP server 124 of the wireless device's disconnection.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method of de-registering a SIP client from a SIP server, the SIP server having a registration that associates the SIP client with a wireless device, the method comprising, in combination:
    a network entity other than the SIP client making a determination that the wireless device is disconnected from a network; and
    in response to the determination, the network entity other than the SIP client notifying the SIP server that the wireless device is disconnected from the network; and
    the SIP server responsively deregistering the SIP client.

2. The method of claim 1, wherein making a determination that the wireless device is disconnected from the network comprises detecting an abnormal disconnection of the wireless device from the network.

3. The method of claim 1, wherein the network entity is an AAA server, and wherein making the determination that the wireless device is disconnected from the network comprises the AAA server receiving a stop accounting message from a PDSN.

4. The method of claim 1, wherein notifying the SIP server that the wireless device is disconnected from the network comprises sending a SIP REGISTER request to the SIP server.

5. The method of claim 4, wherein the SIP REGISTER request indicates a registration duration of zero seconds.

6. The method of claim 1, wherein notifying the SIP server that the wireless device is disconnected from the network comprises sending a SIP NOTIFY message to the SIP server, wherein the SIP notify message indicates that the wireless device is disconnected from the network.

7. The method of claim 1, wherein the network entity is an AAA server.

8. The method of claim 1, wherein the network entity is a PDSN.

9. A method for registering and deregistering a SIP client from a SIP server, comprising:

- receiving a registration request from a SIP client running on a wireless device and responsively creating a registration for the SIP client;
- providing a notification to a network element other than the SIP client, wherein the notification indicates the registration for the SIP client;
- receiving a notification from the network element of a disconnection of the wireless device from a network; and
- in response to the notification deregistering the SIP client from the SIP server.

10. A computer readable medium having stored therein instructions for causing a central processing unit to execute the method of claim 9.

11. The method of claim 9, wherein receiving a registration request comprises receiving a SIP REGISTER request, and wherein the SIP REGISTER request includes an NAI, a MIN and an IP address for the wireless device.

12. The method of claim 9, wherein providing a notification of the registration to the network element comprises sending a SIP SUBSCRIBE request to the network element.

13. The method of claim 12, wherein the SIP SUBSCRIBE request includes a NAI, a MIN and an IP address for the wireless device.

14. The method of claim 9, wherein the network element is an AAA server.

15. The method of claim 9, wherein receiving a notification from the network element of a disconnection of the wireless device comprises receiving a SIP REGISTER request from the network element.

16. The method of claim 15, wherein the SIP REGISTER request indicates a registration duration of zero seconds.

17. The method of claim 9, wherein the second network element is a PDSN.

18. The method of claim 9, wherein receiving a notification from the network element of a disconnection of the wireless device comprises receiving a SIP NOTIFY message from the network element, wherein the SIP NOTIFY message indicates that the wireless device is disconnected from the network.

19. A method for managing a registration of a SIP client in a SIP server, comprising:

- a network element other than the SIP client receiving an indication of a registration of the SIP client with the SIP server, wherein the SIP client runs on a wireless device;
- detecting a disconnection of the wireless device from a telecommunications network; and
- the network element sending the SIP server a message that causes the SIP server to responsively deregister the SIP client.

20. A computer readable medium having stored therein instructions for causing a central processing unit to execute the method of claim 19.

21. The method of claim 19, wherein receiving an indication of the registration of a SIP client comprises receiving a SIP SUBSCRIBE request from the SIP server.

22. The method of claim 19, wherein detecting a disconnection of the wireless device comprises receiving a stop accounting message from a PDSN.

23. The method of claim 19, wherein detecting a disconnection of the wireless device comprises detecting an abnormal disconnection of the wireless device.

24. The method of claim 19, wherein sending the SIP server a message comprises sending a SIP REGISTER request to the SIP server.

25. The method of claim 24, wherein the SIP REGISTER request indicates a registration duration zero seconds.

26. The method of claim 19, wherein sending the SIP server a message comprises sending a SIP NOTIFY message to the SIP server.

27. The method of claim 19, wherein the wireless device is a mobile phone, a cellular phone, a personal digital assistant or a wirelessly equipped computer.

* * * * *